Sept. 6, 1938.  I. L. PATTON  2,129,149
LICENSE PLATE HOLDER
Filed Jan. 21, 1938  2 Sheets-Sheet 1
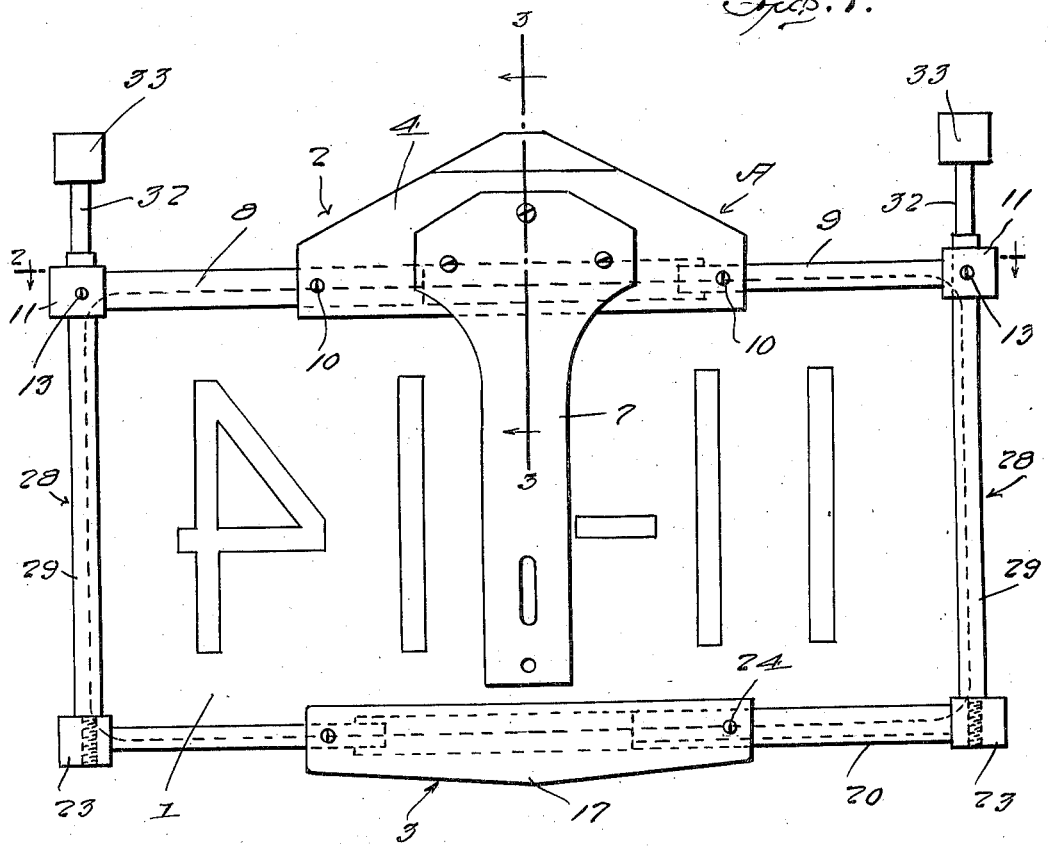
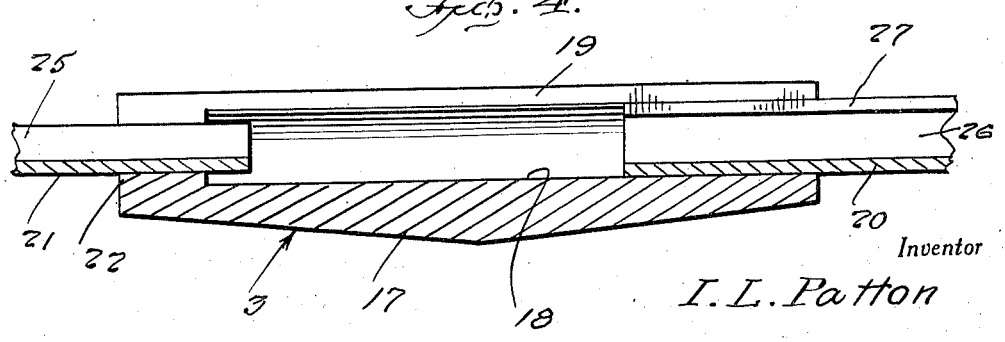
Inventor
I. L. Patton
By Clarence A. O'Brien
Hyman Berman
Attorneys Sept. 6, 1938.  I. L. PATTON  2,129,149
LICENSE PLATE HOLDER
Filed Jan. 21, 1938  2 Sheets-Sheet 2
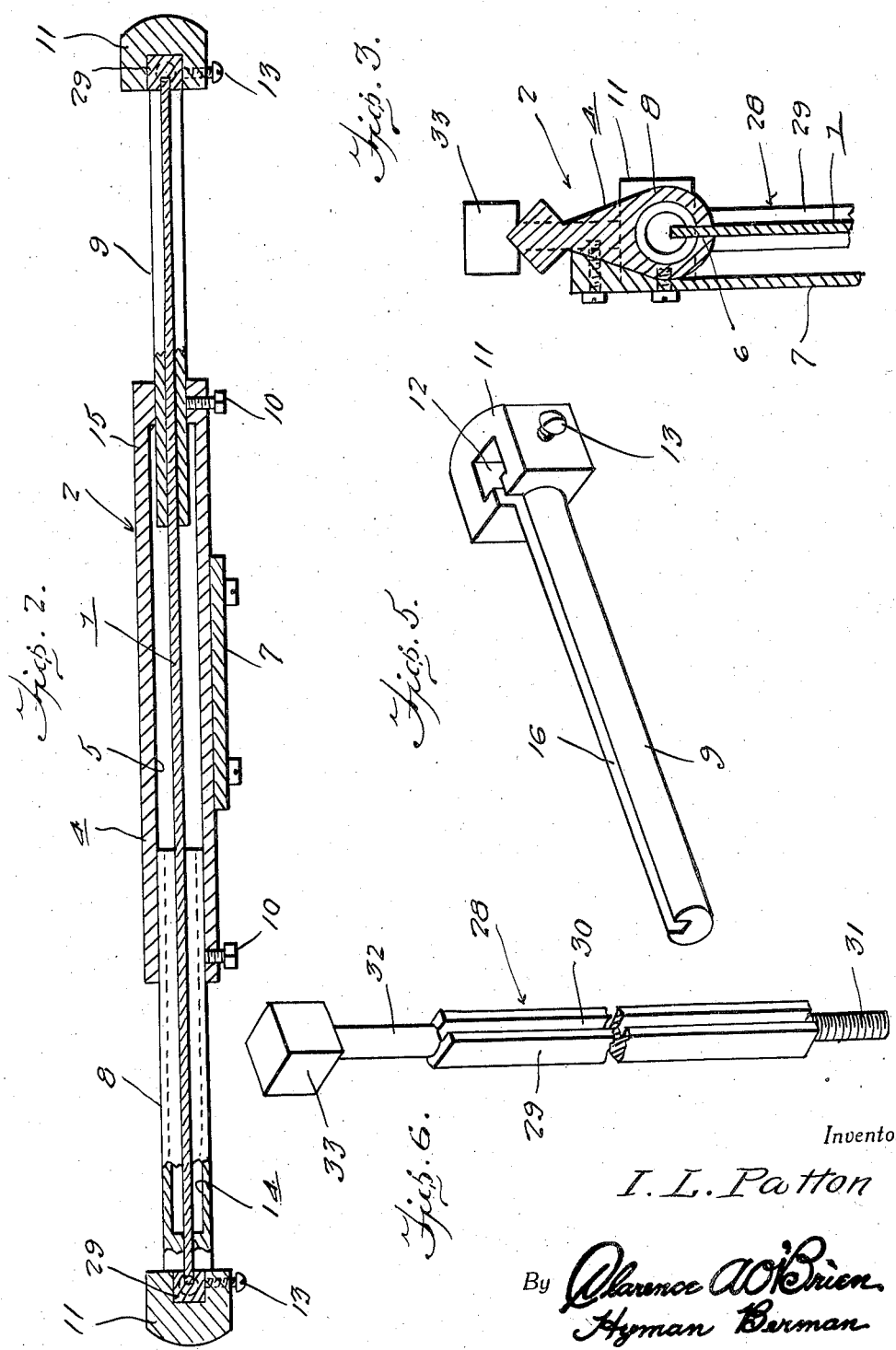
Inventor
I. L. Patton
By Clarence A. O'Brien
Hyman Berman
Attorneys Patented Sept. 6, 1938

2,129,149

UNITED STATES PATENT OFFICE 2,129,149

LICENSE PLATE HOLDER

Inman Leslie Patton, Eldorado, Ill.

Application January 21, 1938, Serial No. 186,199

3 Claims. (Cl. 40—125)

The present invention relates to new and useful improvements in license plate holders for automobiles and has for one of its important objects to provide, in a manner as hereinafter set forth, a device of the character comprising an attractive frame whereby the appearance of a license plate will be enhanced while at the same time firmly supporting said license plate.

Another very important object of the invention is to provide an automobile license plate holder embodying a frame which may be expeditiously adjusted to accommodate different sizes of plates.

Other objects of the invention are to provide a license plate holder of the character described which will be comparatively simple in construction, strong, durable, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in rear elevation of an embodiment of the invention, showing a license plate mounted therein.

Figure 2 is a view in horizontal section through an upper portion of the invention, taken substantially on the line 2—2 of Fig. 1.

Figure 3 is a vertical sectional view through an upper portion of the invention, taken substantially on the line 3—3 of Fig. 1.

Figure 4 is a view in vertical longitudinal section through a lower portion of the device.

Figure 5 is a detail view in bottom perspective of one of the upper slidably adjustable members.

Figure 6 is a detail view in perspective of one of the side members.

Referring now to the drawings in detail, it will be seen that the embodiment of the invention which has been illustrated comprises a frame A, said frame being adapted to enclose a conventional license plate 1 and including upper and lower sections which are designated generally by the reference numerals 2 and 3, respectively. The upper frame section 2 includes a metallic sleeve 4 of substantially the shape shown to advantage in Figs. 1, 2 and 3 of the drawings, the bore 5 of said sleeve being provided with a slot 6 in its bottom extending from end to end thereof. Rigidly secured to the back of the sleeve 4 and extending downwardly therefrom is a bracket 7 for mounting the device on the vehicle. The upper frame section 2 further includes comparatively large and small slidably adjustable rods 8 and 9, respectively, which are mounted in the bore 5 of the sleeve 4. Set screws 10 in the end portions of the sleeve 4 secure the members 8 and 9 in adjusted position. At their outer ends, the adjustable rods 8 and 9 are provided with enlargements or heads 11. Extending vertically through the heads 11 are substantially square openings 12. Set screws 13 are provided in the heads 11 for a purpose to be presently set forth.

Extending into the slidably adjustable rod 8 from the inner end thereof to a point in spaced relation to the head 11 thereon is a socket 14 in which the comparatively small rod 9 is engageable. The end portion of the bore 5 of the sleeve 4 in which the comparatively small rod 9 is slidably mounted is reduced, as at 15. The adjustable rods 8 and 9 are provided in their lower portions with longitudinal slots or grooves 16 extending from the inner ends thereof to the openings 12 in the heads 11.

The lower frame section 3 comprises a metallic sleeve 17 which is substantially similar in construction to the sleeve 4 and which comprises a longitudinal bore 18 having a slot 19 in its upper portion extending from end to end thereof. Mounted for sliding adjustment in the bore 18 of the sleeve 17 are comparatively large and small rods 20 and 21, respectively. The end portion of the sleeve 17 which receives the comparatively small rod 21 is reduced, as at 22. On their outer ends, the rods 20 and 21 are provided with enlargements or heads 23 having threaded openings extending vertically therethrough, the purpose of which will also be presently set forth. Set screws 24 in the end portions of the sleeve 17 secure the rods 20 and 21 in adjusted position. Attention is here invited to the fact that the comparatively large and small adjustable members of the upper and lower frame sections 2 and 3 are arranged at opposite ends of their respective sleeves 4 and 17.

The rod 21 has formed therein a longitudinal groove 25 extending from its inner end to the threaded opening in the head 23 thereon. The rod 20 has formed longitudinally therein a socket 26 for the reception of the rod 21, said socket 26 extending from the inner end of the rod 20 to a point adjacent the head 23 on the outer end thereof. Also formed longitudinally in the rod 20 and communicating with the socket 26 is a slot 27 extending from the inner end of the rod to the threaded opening in the head 23 thereof.

The grooves or slots in the elements 4, 8 and 9 communicate with each other for receiving the upper marginal portion of the license plate 1 and the grooves or slots 25, 27 and 19 in the elements 21, 20 and 17 communicate with each other for receiving the lower marginal portion or edge of said license plate.

The upper and lower frame sections 2 and 3 are adjustably connected to each other through the medium of side members which are designated generally by the reference numeral 28. The side members 28 comprise substantially square bars 29 of suitable metal having grooves 30 in their inner faces for the reception of the vertical side edges of the license plate 1. The bars 29 are mounted for sliding adjustment in the openings 12 of the heads 11 on the outer ends of the rods 8 and 9 and secured by the set screws 13. At their lower ends, the side members 28 terminate in threaded shanks 31 which are adapted to be screwed into the threaded openings which are provided therefor in the heads 23 of the rods 20 and 21. Rising from the bars 29 are necks 32 which are provided on their upper ends with polygonal heads 33.

It is thought that the manner of using the device will be readily apparent from a consideration of the foregoing. The construction and arrangement is such that a continuous groove or channel is provided in the frame A for the reception of the marginal portions of the license plate 1. By simply loosening the set screws 10, 24 and 13 the size of the frame A may be conveniently increased or decreased both laterally and vertically to accommodate various sizes of license plates. With all of the set screws loosened, and with the smooth circular neck portions 32 of the side members 28 engaged in the openings 12, the shanks 31 of said side members are threaded into the heads 23 of the rods 20 and 21 of the lower frame member 3. The lower edge of the license plate 1 is then engaged in the grooves or slots provided therefor in the lower frame member 3 and said lower frame member, together with the side members 28, are then moved upwardly in a manner to engage the square bars 29 of said side members in the openings 12 and to engage the upper marginal portion of the license plate in the grooves or slots provided therefor in the upper frame section 2. The set screws 13 are then tightened to secure the side members 28 in adjusted position in the openings 12. The rods 8, 9, 20 and 21 are then slid inwardly in their respective sleeves 4 and 17 for engaging the vertical edges of the license plate 1 in the grooves 30 of the bars 29, after which the set screws 10 and 24 are tightened. It will thus be seen that the license plate is firmly secured in the frame. Of course, any other suitable procedure may be followed for mounting the license plate in the device.

It is believed that the many advantages of a license plate holder constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:—

1. A license plate holder comprising a frame including upper and lower sections, each section including a sleeve and telescopic rods mounted for sliding adjustment in said sleeves and projecting from the ends thereof, said sleeves and rods having slots therein for the reception of the upper and lower marginal portions of a license plate, means for securing the rods in adjusted position in the sleeves, and means adjustably connecting the upper and lower frame sections together, heads on the outer ends of the rods, the heads of the upper rods having polygonal openings extending vertically therethrough, the last named means including side members comprising polygonal bars having grooves therein for the reception of the vertical edges of the license plate, shanks on the lower ends of the bars engaged in the heads of the lower rods, the upper portions of said bars being slidably engaged in the openings in the heads of the upper bars, and means for securing the bars in adjusted position in the openings.

2. A license plate holder comprising a frame including upper and lower sections, each section including a sleeve and telescopic rods mounted for sliding adjustment in said sleeves and projecting from the ends thereof, said sleeves and rods having slots therein for the reception of the upper and lower marginal portions of a license plate, means for securing the rods in adjusted position in the sleeves, and means adjustably connecting the upper and lower frame sections together, heads on the outer ends of the rods, the heads of the upper rods having polygonal openings extending vertically therethrough, the last named means including side members comprising polygonal bars having grooves therein for the reception of the vertical edges of the license plate, shanks on the lower ends of the bars engaged in the heads of the lower rods, the upper portions of said bars being slidably engaged in the openings in the heads of the upper bars, and means for securing the bars in adjusted position in the openings, said side members further including reduced necks on the upper ends of the bars rotatable in the openings, and heads on the upper ends of said necks.

3. A license plate holder of the class described comprising a frame including upper and lower sections, the upper section comprising a metallic sleeve, a supporting bracket fixed on said sleeve, the bore of the sleeve having a longitudinal slot in its lower portion, telescopic rods slidably mounted in the end portions of the sleeve and projecting therefrom, said rods having grooves therein communicating with the slot in the sleeve, the grooves and the slot being adapted to receive the upper marginal portion of a license plate, heads on the outer ends of the rods having polygonal openings extending vertically therethrough, the lower section comprising a metallic sleeve, the bore of the second named sleeve having a longitudinal slot therein, telescopic rods mounted for sliding adjustment in the end portions of the second named sleeve and projecting therefrom, the second named rods having longitudinal grooves therein communicating with the slot in the second named sleeve and, together with said slot, being adapted to receive the lower marginal portion of the license plate, means for releasably securing the second named rods in adjusted position, heads on the outer ends of the second named rods, and side members adjustably connecting the upper and lower frame sections, said side members including polygonal bars having grooves therein for the reception of the vertical marginal portions of the license plate, threaded shanks on the lower ends of the bars threadedly engaged in the second named heads, the upper portions of said bars extending slidably through the openings in the first named heads, means in said first named heads for releasably securing the bars in adjusted position, necks extending upwardly from the bars and adapted to be rotated in the polygonal openings in the first named heads, and heads on the upper ends of said necks.

INMAN LESLIE PATTON.